(12) United States Patent
Nakamura et al.

(10) Patent No.: US 10,243,418 B2
(45) Date of Patent: Mar. 26, 2019

(54) ROTARY ELECTRIC MACHINE STATOR AND MANUFACTURING METHOD THEREFOR

(71) Applicant: Mitsubishi Electric Corporation, Tokyo (JP)

(72) Inventors: Masashi Nakamura, Tokyo (JP); Kohei Egashira, Tokyo (JP); Tatsuro Hino, Tokyo (JP); Tetsuya Yokogawa, Tokyo (JP); Shinkichi Sawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 399 days.

(21) Appl. No.: 15/240,394

(22) Filed: Aug. 18, 2016

(65) Prior Publication Data
US 2017/0256996 A1    Sep. 7, 2017

(30) Foreign Application Priority Data

Mar. 4, 2016   (JP) ................ 2016-042033

(51) Int. Cl.
*H02K 3/12*     (2006.01)
*H02K 3/50*     (2006.01)
*H02K 3/28*     (2006.01)
*H02K 1/16*     (2006.01)

(52) U.S. Cl.
CPC .............. *H02K 1/16* (2013.01); *H02K 3/12* (2013.01); *H02K 3/28* (2013.01)

(58) Field of Classification Search
CPC .. H02K 3/00; H02K 3/12; H02K 3/18; H02K 3/28; H02K 3/30; H02K 3/50; H02K 15/00; H02K 15/0081; H02K 15/02; H02K 15/04; H02K 15/045; H02K 15/06

See application file for complete search history.

(56) References Cited

U.S. PATENT DOCUMENTS

| | | | |
|---|---|---|---|
| 9,887,599 B2 * | 2/2018 | Sakaue | H02K 1/16 |
| 9,906,085 B2 * | 2/2018 | Nakamura | H02K 3/12 |
| 2002/0180299 A1 * | 12/2002 | Oohashi | H02K 3/28 310/184 |
| 2017/0117768 A1 * | 4/2017 | Nakamura | H02K 1/16 |

FOREIGN PATENT DOCUMENTS

JP     5810869 B2     11/2015

* cited by examiner

*Primary Examiner* — Tran Nguyen
(74) *Attorney, Agent, or Firm* — Sughrue Mion, PLLC; Richard C. Turner

(57) ABSTRACT

A three-phase alternating-current winding is configured by connecting first conductor terminals and second conductor terminals that are disposed in a circular arc-shaped region using connecting units, electric power supplying terminals of the three-phase alternating-current winding are constituted by the first conductor terminals and the second conductor terminals that are disposed in the circular arc-shaped region, a number of parallel phase windings in the three-phase alternating-current winding is n, where n is a natural number that is greater than or equal to one, an angular range of the circular arc-shaped region is less than or equal to (180×n) electrical degrees, and the second conductor terminals that constitute the electric power supplying terminals are positioned between adjacent first conductor terminals when viewed from a radially outer side.

7 Claims, 9 Drawing Sheets

ROTARY ELECTRIC MACHINE STATOR AND MANUFACTURING METHOD THEREFOR

BACKGROUND OF THE INVENTION

1. Field of the Invention

The present invention relates to a rotary electric machine stator for an electric motor or a generator, for example, and a manufacturing method therefor, and particularly relates to construction of alternating-current connecting portions of a three-phase alternating-current winding.

2. Description of the Related Art

In generators that are used in electric vehicles (EVs), plug-in electric vehicles (PEVs), etc., busbars that have large cross-sectional areas are used because large currents are passed through the stator winding. Thus, because connecting units that include the busbars are increased in size and lead to interference with peripheral parts of an electric motor, techniques are desired in which connecting units are housed compactly in a vicinity of the electric motor.

In consideration of such conditions, in a conventional rotary electric machine that is described in Patent Literature 1, an attempt has been made to make connecting units compact by disposing busbars in two layers in an axial direction axially outside a coil end of a stator winding, and producing the connecting units so as to be covered integrally by an insulating member while also insulating between the busbars.

CITATION LIST

Patent Literature

Patent Literature 1: Japanese Patent No. 5810869 (Gazette)

SUMMARY OF THE INVENTION

Generally, in three-phase motors in which distributed windings that are produced by winding conductors into an identical pattern are arranged at a pitch of one slot circumferentially, alternating-current connecting wire portions such as electric power supplying terminals and neutral points of phase windings that are formed by connecting the windings are connected using connecting units. In this case, circumferential regions occupied by the connecting units can be narrowed as much as possible by connecting terminal wires such as electric power supplying terminals and the neutral points of the phase windings within a range of 180 electrical degrees. Here, the alternating-current connecting portions are connected in a combination in which directions of electric current inside the slots are reversed, such as U-V-W, or U-V-W. In this case, connection of the alternating-current connecting wire portions can be implemented within 180 electrical degrees among the three terminal wires that constitute the electric power supplying terminals by leading just one terminal wire out from a radial position that is different than that of the remaining two terminal wires because the directions of electric current are reversed, as mentioned above. However, because the radial outlet positions of the three terminal wires are different, the connections cross each other complicatedly, leading to increases in the size of the connecting units.

In hybrid electric vehicles (HEVs) in recent years, in particular, there is a tendency for power supply voltages to be increased in order to increase power density relative to body dimensions in rotary electric machines. Because the need to increase electrical insulation distances between parts that have different voltage phases increases as the voltage increases, in the above-mentioned configuration that has different radial outlet positions for the three terminal wires, this leads to further increases in the size of the connecting units.

In the conventional rotary electric machine that is described in Patent Literature 1, because all three terminal wires that constitute the electric power supplying terminals are disposed so as to be led out from an outer circumferential side alternately in an circumferential direction, the alternating-current connecting portions can be connected in a combination of U-V-W or U-V-W by a simple construction without any trouble, and electrical insulation distances between parts can also be sufficiently ensured. However, in the conventional rotary electric machine that is described in Patent Literature 1, the alternating-current connecting portions are connected within a range of 360 electrical degrees, i.e., using twice as much space in a circumferential direction, and it cannot be said that the problem of reducing the size of the connecting units has been solved satisfactorily.

The present invention aims to solve the above problems and an object of the present invention is to provide a rotary electric machine stator and a manufacturing method therefor that ensures insulation and enables reductions in size of connecting units to be achieved while suppressing a circular arc-shaped region for alternating-current connecting portions to less than or equal to (180×n) electrical degrees, where n is a number of parallel phase windings.

A rotary electric machine stator according to the present invention includes: an annular stator core in which slots are arranged circumferentially; and a three-phase alternating-current winding that is mounted to the stator core. The three-phase alternating-current winding includes distributed winding bodies that are each constituted by a jointless continuous conductor wire that is coated with insulation, the distributed winding bodies being mounted to the stator core circumferentially at a pitch of one slot so as to be equal in number to a total number of the slots, a first conductor terminal of the conductor wire that constitutes the winding bodies extends outward at a first axial end of the stator core from a radially outermost position inside the slots, and a second conductor terminal of the conductor wire extends outward at the first axial end of the stator core from a radially innermost position inside the slots. A plurality of small coil groups each constitute a series connected body of a plurality of the winding bodies in which the first conductor terminals of winding bodies and the second conductor terminals of winding bodies that are subject to connection therewith are connected, first conductor terminals that constitute respective first ends of the plurality of small coil groups among the first conductor terminals are disposed so as to be spaced apart from each other circumferentially around a radially outer side of a circular arc-shaped region that extends circumferentially around a coil end of the three-phase alternating-current winding that is formed at the first axial end of the stator core, and second conductor terminals that constitute respective second ends of the plurality of small coil groups among the second conductor terminals are arranged so as to be spaced apart from each other circumferentially around a radially inner side of the circular arc-shaped region. The three-phase alternating-current winding is configured by connecting the first conductor terminals and the second conductor terminals that are disposed in the circular arc-shaped region using connecting units, electric power supplying terminals of the three-phase alternating-current winding are constituted by the first conductor terminals and the second conductor terminals that are disposed in the circular arc-shaped region, a number of parallel phase windings in the three-phase alternating-current winding is n, where n is a natural number that is greater than or equal to one, an angular range of the circular arc-shaped region is less than or equal to (180×n) electrical degrees, and the second conductor terminals that constitute the electric power supplying terminals are positioned between adjacent first conductor terminals when viewed from a radially outer side.

According to the present invention, because the circular arc-shaped region for the alternating-current connecting portions is less than or equal to (180×n) electrical degrees, circumferential space for the circular arc-shaped region can be reduced, making reductions in the size of the connecting units possible, thereby enabling the stator to be reduced in size.

Because the second conductor terminals that constitute the electric power supplying terminals are positioned between adjacent first conductor terminals when viewed from a radially outer side, electric power supply from outside to the second conductor terminals can be performed between adjacent first conductor terminals that are positioned radially outside the second conductor terminals in question. Insulation can thereby be ensured without adopting a three-dimensional crossing construction of a kind that passes axially outside the first conductor terminals to supply electric power to the second conductor terminals, and construction of the connecting units can also be simplified.

DETAILED DESCRIPTION OF THE PREFERRED EMBODIMENTS

A preferred embodiment of a rotary electric machine stator according to the present invention will now be explained with reference to the drawings.

Embodiment 1

Figure 1:
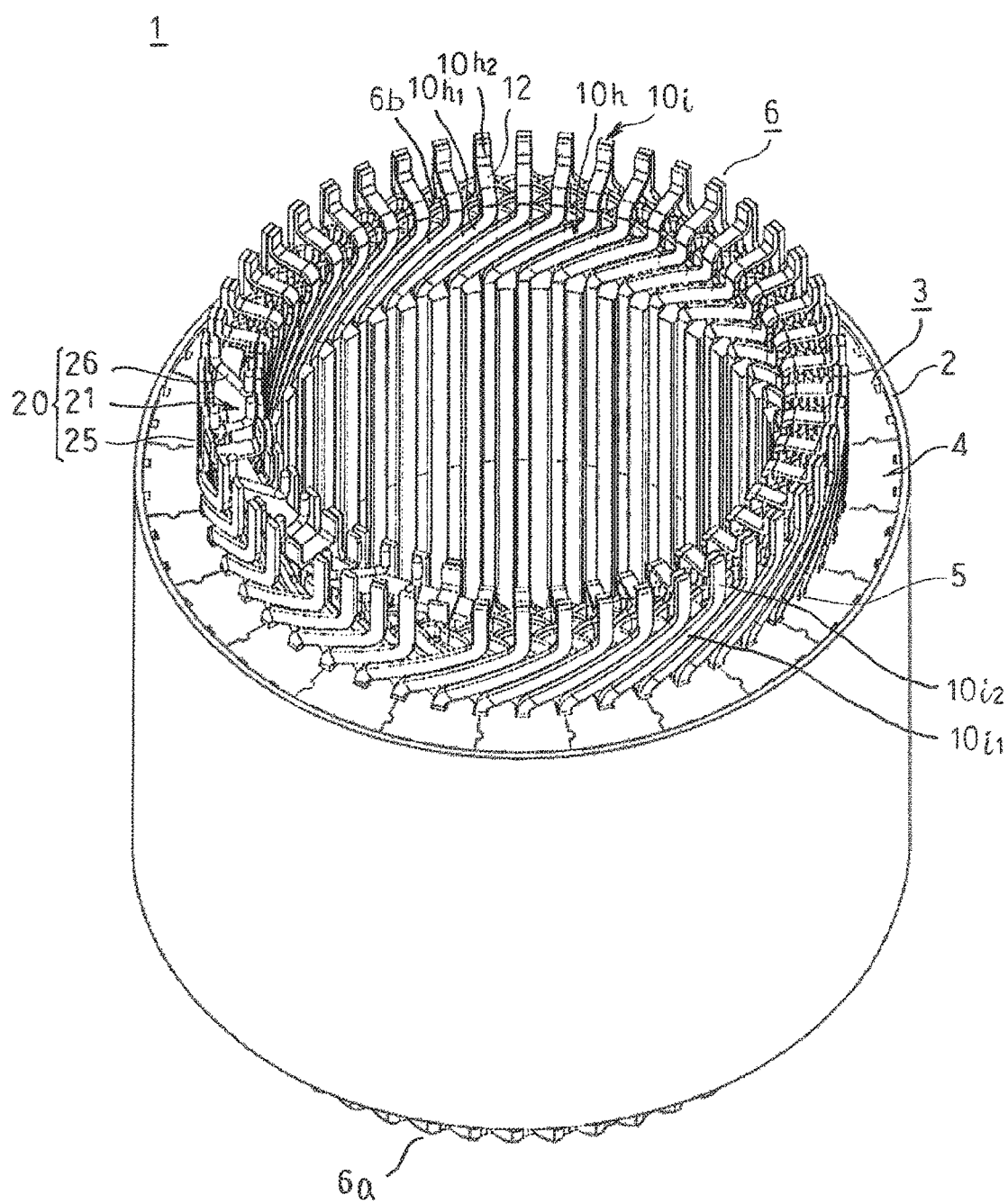
FIG. 1 is an oblique projection that shows a rotary electric machine stator according to Embodiment 1 of the present invention.
Figure 2:
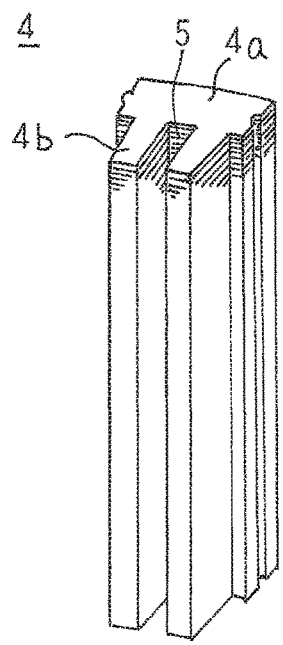
FIG. 2 is an oblique projection that shows a core block that constitutes part of a stator core in the rotary electric machine stator according to Embodiment 1.
Figure 3:
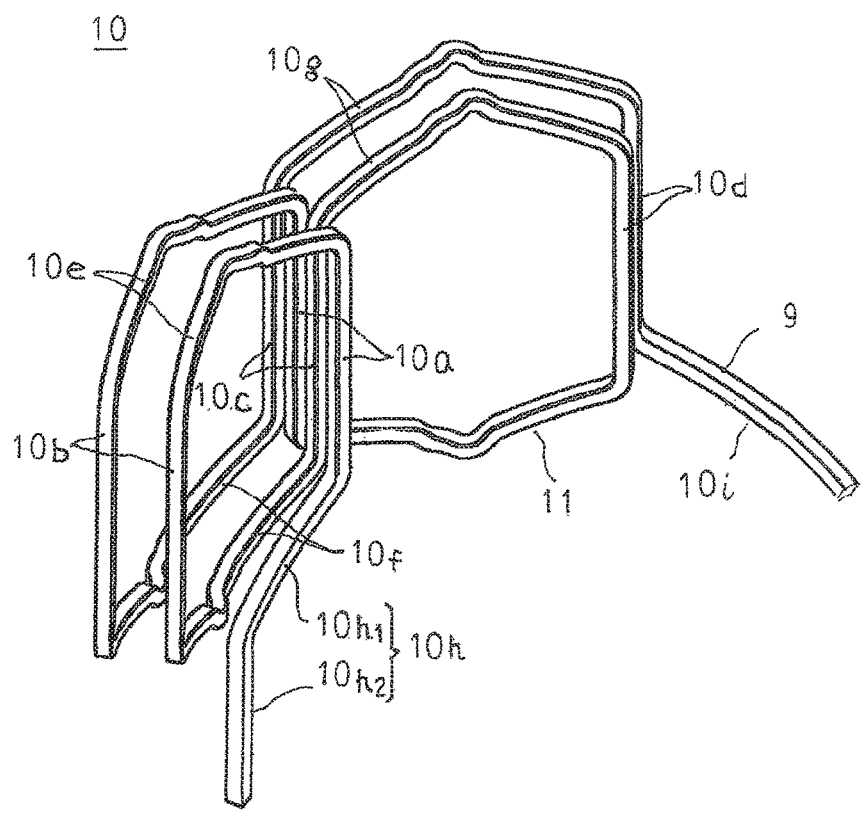
FIG. 3 is an oblique projection that shows a winding body that constitutes part of a stator winding in the rotary electric machine stator according to Embodiment 1.
Figure 4:
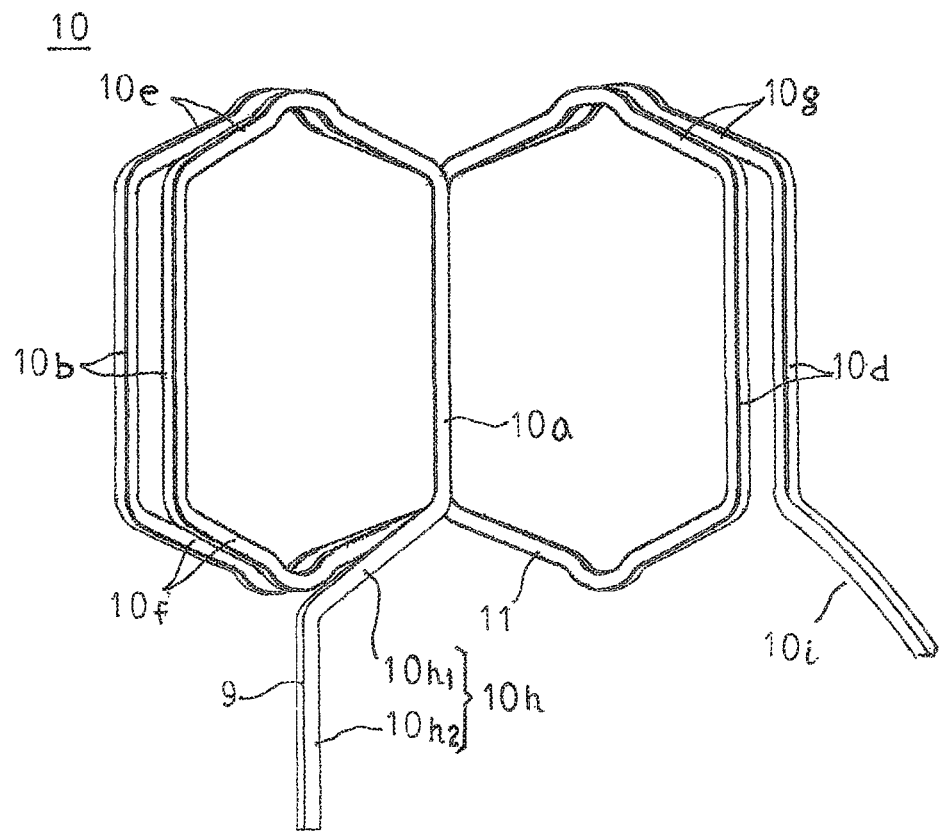
FIG. 4 is a front elevation that shows the winding body that constitutes part of the stator winding in the rotary electric machine stator according to Embodiment 1.
Figure 5:
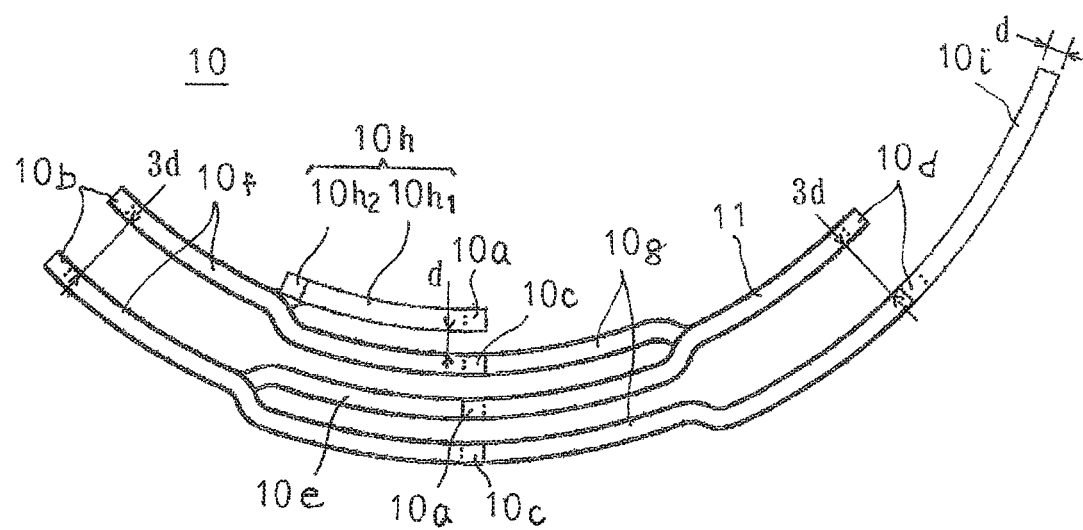
FIG. 5 is an end elevation viewed from a side near second coil ends that shows the winding body that constitutes part of the stator winding in the rotary electric machine stator according to Embodiment 1.
Figure 6:
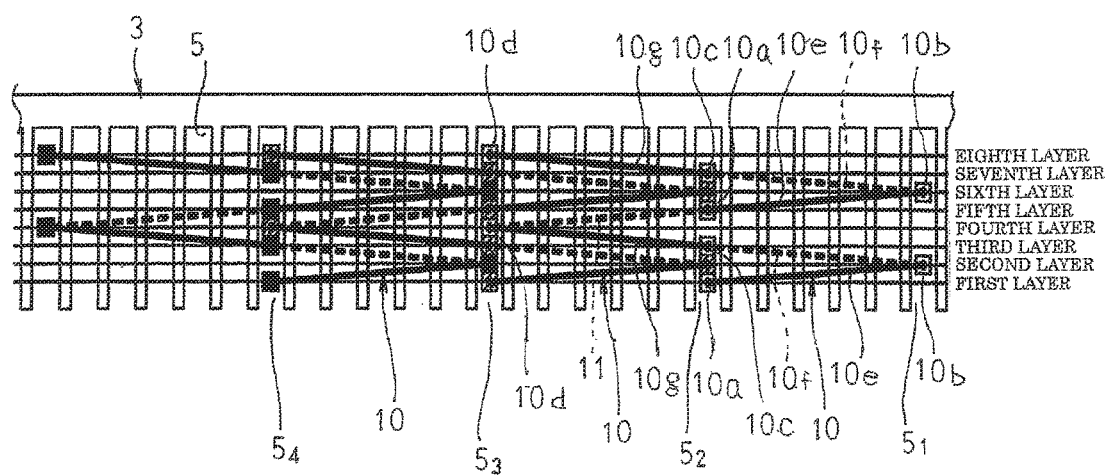
FIG. 6 is a partial end elevation viewed from a side near second coil ends that shows a state in which three winding bodies that constitute part of the stator winding in the rotary electric machine stator according to Embodiment 1 are mounted into the stator core so as to share a single slot.
Figure 7:
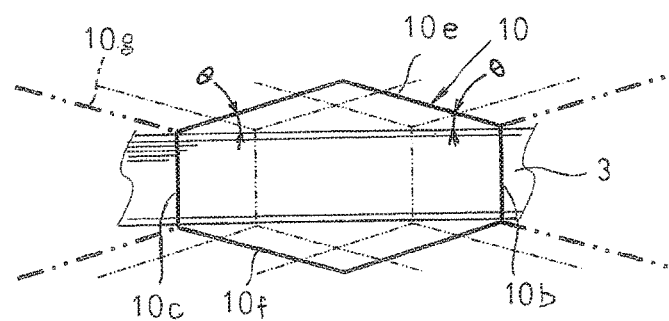
FIG. 7 is a developed projection viewed from radially outside that shows a winding body that is mounted onto the stator core in the rotary electric machine stator according to Embodiment 1.
Figure 8:
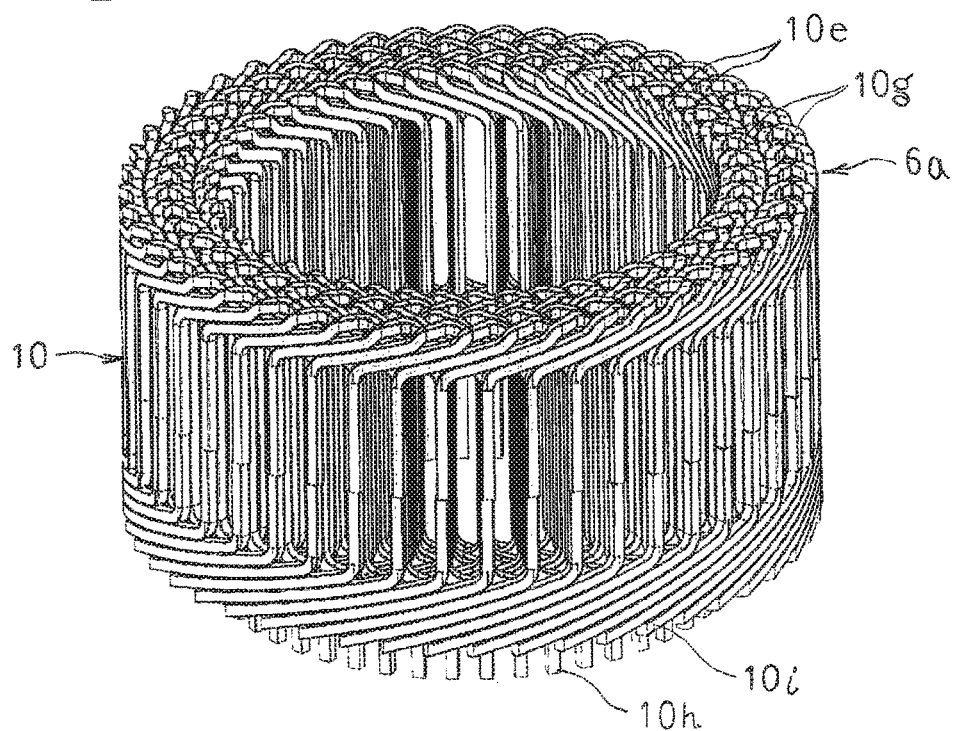
FIG. 8 is an oblique projection that shows a winding assembly that constitutes part of a stator winding in the rotary electric machine stator according to Embodiment 1.
Figure 9:
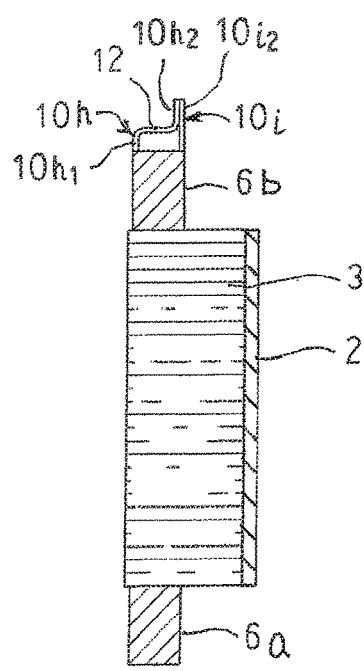
FIG. 9 is a partial cross section that explains joining of the winding bodies in the rotary electric machine stator according to Embodiment 1.
Figure 10:
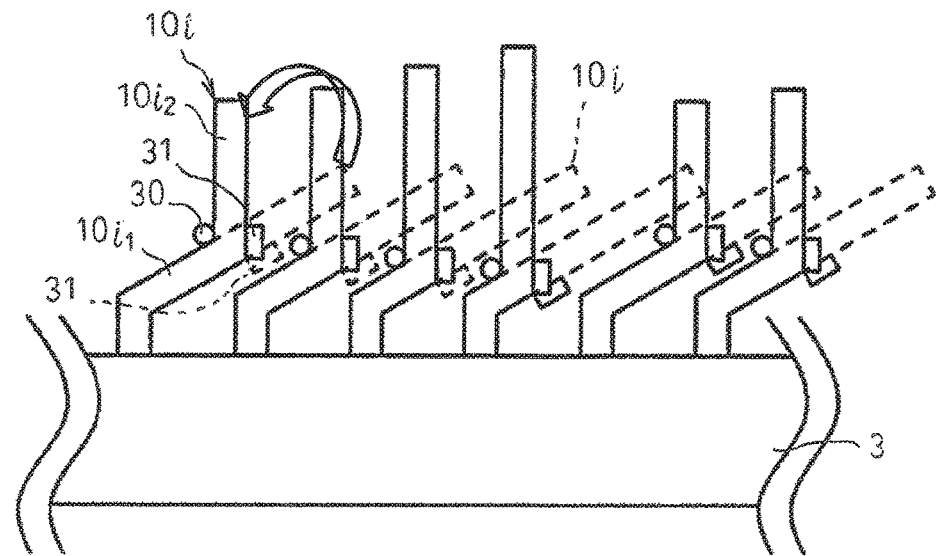
FIG. 10 is a schematic diagram that explains a step of bending first conductor terminals of alternating-current connecting portions in the rotary electric machine stator according to Embodiment 1.
Figure 11:
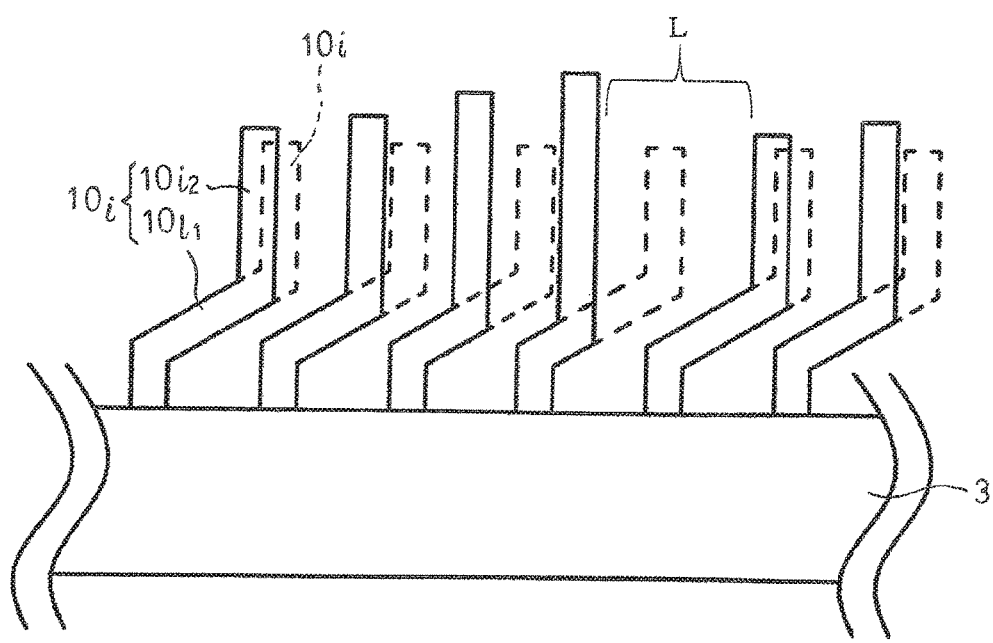
FIG. 11 is a schematic diagram that shows a state of the alternating-current connecting portions after the step of bending the first conductor terminals of the alternating-current connecting portions in the rotary electric machine stator according to Embodiment 1 viewed from a radially outer side.
Figure 12:
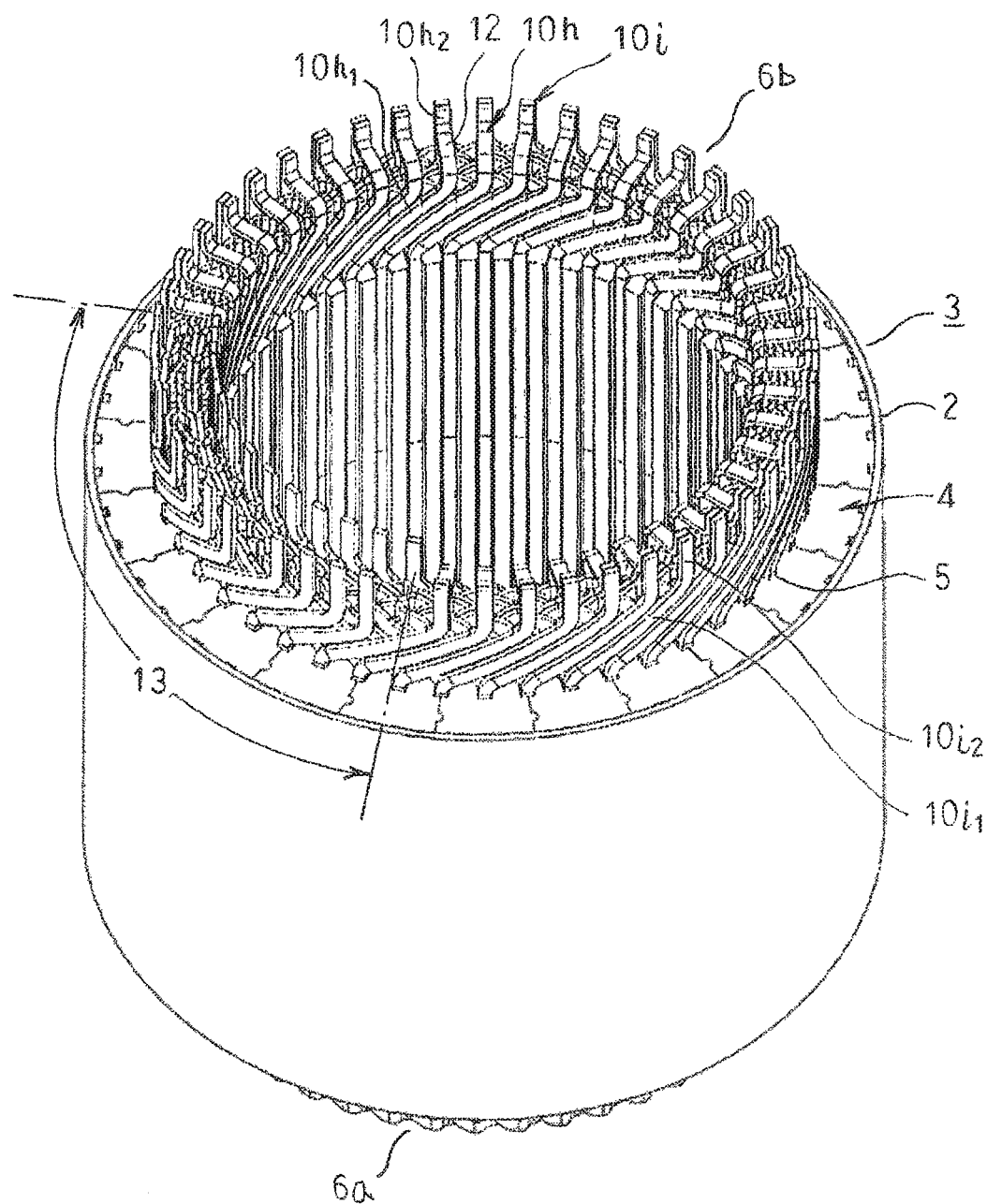
FIG. 12 is an oblique projection that shows a state in which the winding assembly that constitutes the stator winding is mounted to the stator core in the rotary electric machine stator according to Embodiment 1.
Figure 13:
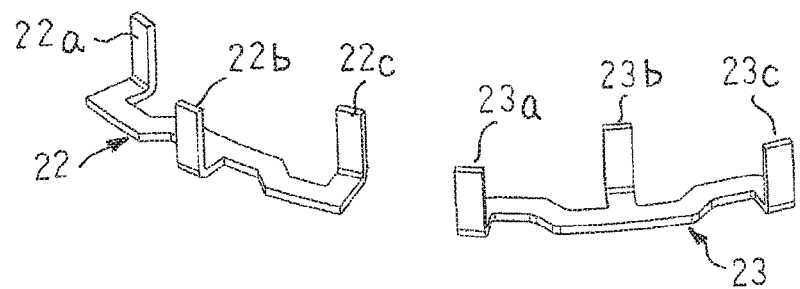
FIG. 13 is an oblique projection that shows first and second neutral point connecting busbars in the rotary electric machine stator according to Embodiment 1.
Figure 14:
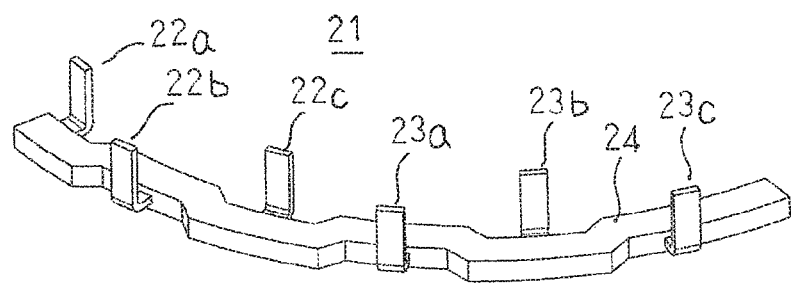
FIG. 14 is an oblique projection that shows a neutral point connecting plate in the rotary electric machine stator according to Embodiment 1.
Figure 15:
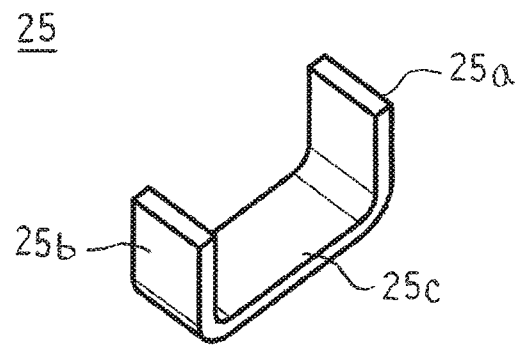
FIG. 15 is an oblique projection that shows electric power supplying coils in the rotary electric machine stator according to Embodiment 1.
Figure 16:
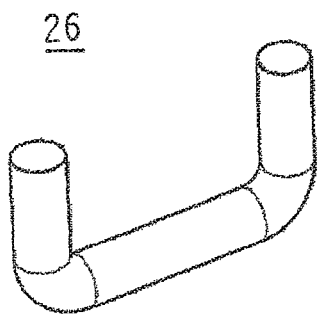
FIG. 16 is an oblique projection that shows a connecting coil in the rotary electric machine stator according to Embodiment 1.
Figure 17:
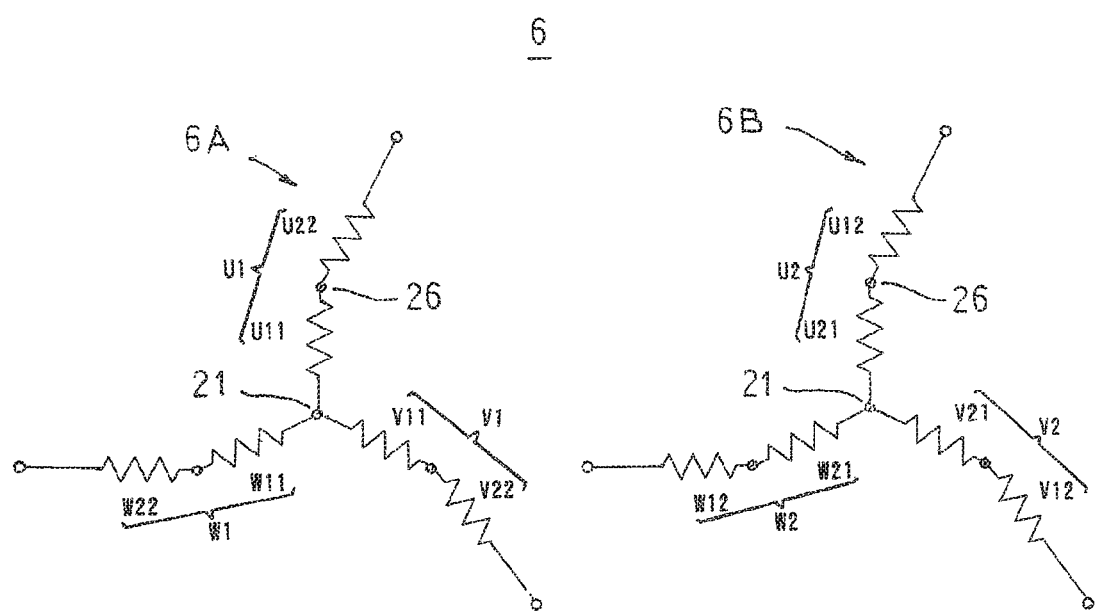
FIG. 17 shows connection diagrams for the stator winding in the rotary electric machine stator according to Embodiment 1.

FIG. 1 is an oblique projection that shows a rotary electric machine stator according to Embodiment 1 of the present invention, FIG. 2 is an oblique projection that shows a core block that constitutes part of a stator core in the rotary electric machine stator according to Embodiment 1, FIG. 3 is an oblique projection that shows a winding body that constitutes part of a stator winding in the rotary electric machine stator according to Embodiment 1, FIG. 4 is a front elevation that shows the winding body that constitutes part of the stator winding in the rotary electric machine stator according to Embodiment 1, FIG. 5 is an end elevation viewed from a side near second coil ends that shows the winding body that constitutes part of the stator winding in the rotary electric machine stator according to Embodiment 1, FIG. 6 is a partial end elevation viewed from a side near second coil ends that shows a state in which three winding bodies that constitute part of the stator winding in the rotary electric machine stator according to Embodiment 1 are mounted into the stator core so as to share a single slot, FIG. 7 is a developed projection viewed from radially outside that shows a winding body that is mounted onto the stator core in the rotary electric machine stator according to Embodiment 1, FIG. 8 is an oblique projection that shows a winding assembly that constitutes part of a stator winding in the rotary electric machine stator according to Embodiment 1, FIG. 9 is a partial cross section that explains joining of the winding bodies in the rotary electric machine stator according to Embodiment 1, FIG. 10 is a schematic diagram that explains a step of bending first conductor terminals of alternating-current connecting portions in the rotary electric machine stator according to Embodiment 1, FIG. 11 is a schematic diagram that shows a state of the alternating-current connecting portions after the step of bending the first conductor terminals of the alternating-current connecting portions in the rotary electric machine stator according to Embodiment 1 viewed from a radially outer side, FIG. 12 is an oblique projection that shows a state in which the winding assembly that constitutes the stator winding is mounted to the stator core in the rotary electric machine stator according to Embodiment 1, FIG. 13 is an oblique projection that shows first and second neutral point connecting busbars in the rotary electric machine stator according to Embodiment 1, FIG. 14 is an oblique projection that shows a neutral point connecting plate in the rotary electric machine stator according to Embodiment 1, FIG. 15 is an oblique projection that shows electric power supplying coils in the rotary electric machine stator according to Embodiment 1, FIG. 16 is an oblique projection that shows a connecting coil in the rotary electric machine stator according to Embodiment 1, and FIG. 17 shows connection diagrams for the stator winding in the rotary electric machine stator according to Embodiment 1. Moreover, in FIG. 10, solid lines represent the first conductor terminals after bending, and broken lines represent the first conductor terminals before bending. Furthermore, in FIG. 11, solid lines represent the first conductor terminals after bending in which the bending position is changed, and broken lines represent the first conductor terminals after bending in which the bending position is constant.

In FIG. 1, a stator 1 is a rotary electric machine stator for an electric motor or a generator, etc., and includes: an annular stator core 3; a stator winding 6 that is mounted to the stator core 3; and connecting units 20 that connect the stator winding 6. Here, to facilitate explanation, the number of slots in the stator core 3 is forty-eight, and the stator winding is a three-phase alternating-current winding. Furthermore, slots 5 are formed on the stator core 3 at a ratio of two slots per phase per pole.

As shown in FIG. 2, core blocks 4 are configured by dividing the annular stator core 3 into twenty-four equal sections circumferentially, are produced by laminating and integrating silicon steel sheets, and include: a core back portion 4a that has a circular arc-shaped cross section; and two teeth 4b that each project radially inward from an inner circumferential wall surface of the core back portion 12a so as to be separated in a circumferential direction. The stator core 3 is produced by arranging twenty-four core blocks 4 into an annular shape circumferentially by butting together circumferential side surfaces of the core back portion 4a such that the teeth 4b are oriented radially inward, and integrating them by shrink-fitting them, or press-fitting them, etc., into a cylindrical frame 2. The slots 5, which are formed by the core back portions 4a and the teeth 4b, are arranged at a uniform angular pitch circumferentially so as to be open on an inner circumferential side.

The stator winding 6 includes forty-eight winding bodies 10 that are disposed at a pitch of one slot circumferentially around the stator core 3.

The winding bodies 10 are distributed windings that are produced by winding conductor wires 9 into edgewise windings, the conductor wires 9 being made of jointless continuous rectangular copper wire that is insulated using an enamel resin, for example. Specifically, as shown in FIGS. 3 through 5, the winding bodies 10 are configured such that two δ-shaped coil patterns that are constituted by a first rectilinear portion 10a, a first coil end portion 10e, a second rectilinear portion 10b, a second coil end portion 10f, a third rectilinear portion 10c, a third coil end portion 10g, and a fourth rectilinear portion 10d are arranged in a longitudinal direction of short sides of oblong cross sections of the conductor wires 9, and the fourth rectilinear portion 10d and the first rectilinear portion 10a are linked using a linking wire 11. The linking wires 11 constitute coil end portions, winding start end portions of the conductor wires 9 constitute second conductor terminals 10h, and winding finish end portions constitute first conductor terminals 10i.

In winding bodies 10 that are configured in this manner, four first rectilinear portions 10a and third rectilinear portions 10c are arranged in a single column such that longitudinal directions of long sides of the oblong cross sections are oriented in a circumferential direction so as to leave gaps d in the longitudinal direction of the short sides of the oblong cross sections. Two second rectilinear portions 10b are arranged so as to be separated by an angular pitch of six slots in a first circumferential direction from the column of first rectilinear portions 10a and third rectilinear portions 10c such that longitudinal directions of long sides of the oblong cross sections are oriented in a circumferential direction so as to leave a gap 3d in the longitudinal direction of the short sides of the oblong cross sections. Two fourth rectilinear portions 10d are arranged so as to be separated by an angular pitch of six slots in a second circumferential direction from the column of first rectilinear portions 10a and third rectilinear portions 10c such that longitudinal directions of long sides of the oblong cross sections are oriented in a circumferential direction so as to leave a gap 3d in the longitudinal direction of the short sides of the oblong cross sections. Moreover, an angular pitch of six slots is a pitch between slot centers of slots 5 on two sides of six consecutive teeth 4b, and corresponds to a pitch of one magnetic pole. Furthermore, d is a length of the short sides of the oblong cross sections of the conductor wires 9.

FIG. 6 shows a state in which three winding bodies 10 are each mounted into the stator core 3 so as to share one slot 5. FIG. 7 shows the state in which the winding bodies 10 are mounted into the stator core when viewed from radially outside. In FIG. 6, three slots 5 that line up at an angular pitch of six slots circumferentially will be designated a first slot $5_1$, a second slot $5_2$, and a third slot $5_3$, in order circumferentially.

In FIGS. 6 and 7, using one winding body 10 as an example, a first coil end portion 10e that extends outward at a second axial end from a first rectilinear portion 10a in a first layer from a slot opening side of the second slot $5_2$ (a radially innermost position) extends toward the first slot $5_1$ circumferentially at an angle of inclination θ, changes lanes (hereinafter "is shifted") radially outward at a vertex portion by a distance d, subsequently extends toward the first slot $5_1$ circumferentially at a reverse angle of inclination θ, and is linked to a second rectilinear portion 10b in a second layer from the slot opening side of the first slot $5_1$. Next, a second coil end portion 10f that extends outward at a first axial end from the second rectilinear portion 10b in the second layer from the slot opening side of the first slot $5_1$ extends toward the second slot $5_2$ circumferentially at an angle of inclination θ, is shifted radially outward at a vertex portion by a distance d, subsequently extends toward the second slot $5_2$ circumferentially at a reverse angle of inclination θ, and is linked to a third rectilinear portion 10c in a third layer from the slot opening side of the second slot $5_2$.

Next, a third coil end portion 10g that extends outward at the second axial end from the third rectilinear portion 10c in the third layer from the slot opening side of the second slot $5_2$ extends toward the third slot $5_3$ circumferentially at an angle of inclination θ, is shifted radially outward at a vertex portion by a distance d, subsequently extends toward the third slot $5_3$ circumferentially at a reverse angle of inclination θ, and is linked to a fourth rectilinear portion 10d in a fourth layer from the slot opening side of the third slot $5_3$.

Next, a linking portion 11 that extends outward at the first axial end from the fourth rectilinear portion 10d in the fourth layer from the slot opening side of the third slot $5_3$ extends toward the second slot $5_2$ circumferentially at an angle of inclination θ, is shifted radially outward at a vertex portion by a distance d, subsequently extends toward the second slot $5_2$ circumferentially at a reverse angle of inclination θ, and is linked to a first rectilinear portion 10a in a fifth layer from the slot opening side of the second slot $5_2$. A first coil end portion 10e that extends outward at the second axial end from the first rectilinear portion 10a in the fifth layer from the slot opening side of the second slot $5_2$ extends toward the first slot $5_1$ circumferentially at an angle of inclination θ, is shifted radially outward at a vertex portion by a distance d, subsequently extends toward the first slot $5_1$ circumferentially at a reverse angle of inclination θ, and is linked to a second rectilinear portion 10b in a sixth layer from the slot opening side of the first slot $5_1$.

Next, the second coil end portion 10f that extends outward at the first axial end from the second rectilinear portion 10b in the sixth layer from the slot opening side of the first slot $5_1$ extends toward the second slot $5_2$ circumferentially at an angle of inclination θ, is shifted radially outward at a vertex portion by a distance d, subsequently extends toward the second slot $5_2$ circumferentially at a reverse angle of inclination θ, and is linked to a third rectilinear portion 10c in a seventh layer from the slot opening side of the second slot $5_2$. Next, a third coil end portion 10g that extends outward at the second axial end from the third rectilinear portion 10c in the seventh layer from the slot opening side of the second slot $5_2$ extends toward the third slot $5_3$ circumferentially at an angle of inclination θ, is shifted radially outward at a vertex portion by a distance d, subsequently extends toward the third slot $5_3$ circumferentially at a reverse angle of inclination θ, and is linked to a fourth rectilinear portion 10d in an eighth layer (a radially outermost position) from the slot opening side of the third slot $5_3$.

Thus, the first rectilinear portion 10a in the first layer of the second slot $5_2$ and the second rectilinear portion 10b in the second layer of the first slot $5_1$ are linked by the first coil end portion 10e, the second rectilinear portion 10b in the second layer of the first slot $5_1$ and the third rectilinear portion 10c in the third layer of the second slot $5_2$ are linked by the second coil end portion 10f, and the third rectilinear portion 10c in the third layer of the second slot $5_2$ and the fourth rectilinear portion 10d in the fourth layer of the third slot $5_3$ are linked by the third coil end portion 10g, to constitute a δ-shaped coil pattern.

In addition, the first rectilinear portion 10a in the fifth layer of the second slot $5_2$ and the second rectilinear portion 10b in the sixth layer of the first slot $5_1$ are linked by the first coil end portion 10e, the second rectilinear portion 10b in the sixth layer of the first slot $5_1$ and the third rectilinear portion 10c in the seventh layer of the first slot $5_1$ are linked by the second coil end portion 10f, and the third rectilinear portion 10c in the seventh layer of the second slot $5_2$ and the fourth rectilinear portion 10d in the eighth layer of the third slot $5_3$ are linked by the third coil end portion 10g, to constitute a δ-shaped coil pattern.

Thus, a winding body 10 is configured by winding a conductor wire 9 into a first slot $5_1$, a second slot $5_2$, and a third slot $5_3$ that line up at an angular pitch of six slots circumferentially, so as to repeat a δ-shaped coil pattern for two iterations in a radial direction, the δ-shaped coil pattern being formed by inserting the conductor wire 9 sequentially in order of the second slot $5_2$, the first slot $5_1$, the second slot $5_2$, and the third slot $5_3$ so as to alternate an axial direction of insertion into the first slot $5_1$, the second slot $5_2$, and the third slot $5_3$.

The winding body 10 is configured by linking the two δ-shaped coil patterns using a linking wire 11 so as to be arranged into two layers in a radial direction. In other words, the winding body 10 is produced by winding the conductor wire 9 in such a way that the two δ-shaped coil patterns become continuous. The first through fourth rectilinear portions 10a, 10b, 10c, and 10d are housed in slots 5 that are shared by three winding bodies 10 such that the longitudinal directions of the long sides of the rectangular cross sections of the conductor wires 9 are oriented circumferentially so as to line up in single columns in a radial direction.

Forty-eight winding bodies 10 that are configured in this manner are arranged concentrically at a pitch of one slot to produce the winding assembly 7 that is shown in FIG. 8. In the winding assembly 7, eight conductors 9 that include first through fourth rectilinear portions 10a, 10b, 10c, and 10d are lined up in a single column radially, and forty-eight such columns are arranged circumferentially at a pitch of one slot. At a second axial end of the winding assembly 7, a layer of first coil end portions 10e in which the first coil end portions 10e are arranged circumferentially at a pitch of one slot and a layer of third coil end portions 10g in which the third coil end portions 10g are arranged circumferentially at a pitch of one slot are arranged alternately in four layers in a radial direction to constitute first coil ends 6a. At a first axial end of the winding assembly 7, a layer of second coil end portions 10f in which the second coil end portions 10f are arranged circumferentially at a pitch of one slot and a layer of linking wires 11 in which the linking wires 11 are arranged circumferentially at a pitch of one slot are arranged alternately in three layers in a radial direction to constitute second coil ends 6b. End portions of the second conductor terminals 10h each extend axially outward from a radially inner side of the second coil ends 6b, and are arranged circumferentially at a pitch of one slot, and end portions of the first conductor terminals 10i each extend axially outward from a radially outer side of the second coil ends 6b, and are arranged circumferentially at a pitch of one slot.

The twenty-four core blocks 4 are mounted from radially outside the winding assembly 7 such that each column of eight conductor wires 9 is inserted into a slot 5. Then, the twenty-four core blocks 4 that are mounted to the winding assembly 7 and arranged into an annular shape are integrated by shrink-fitting, press-fitting, etc., into the frame 2. The winding assembly 7 is mounted to the stator core 3 thereby.

Shapes of the second conductor terminals 10h and the first conductor terminals 10i of the winding bodies 10 will now be explained using FIGS. 3 through 6. The second conductor terminals 10h that extend outward near the second coil ends 6b from the first rectilinear portions 10a in the first layer of the second slots $5_2$ are formed so as to extend toward the first slots $5_1$ circumferentially at an angle of inclination θ and be bent at vertex portions (intermediate positions between the first slots $5_1$ and the second slots $5_2$) to extend axially outward. Here, regions that extend outward near the second coil ends 6b from the first rectilinear portions 10a in the first layer of the second slots $5_2$ and extend toward the first slots $5_1$ circumferentially at an angle of inclination θ become second inclined portions 10h1, and regions that are bent at vertex portions to extend axially outward to tip ends become second upright portions $10h_2$.

The first conductor terminals 10*i* that extend outward near the second coil ends 6*b* from the fourth rectilinear portions 10*d* in the eighth layer of the third slots $5_3$ are formed so as to extend toward the fourth slots $5_4$ circumferentially at an angle of inclination θ.

Bending is applied to the second conductor terminals 10*h* and the first conductor terminals 10*i* of the winding assembly 7 that is mounted to the stator core 3.

First, bending is applied to connections of twelve small coil groups U11, U12, U21, U22, V11, V12, V21, V22, W11, W12, W21, and W22 that are described below, specifically, thirty-six circumferentially consecutive second conductor terminals 10*h* that do not serve as connections in alternating-current connecting portions. Although not shown, root portions of the second upright portions $10h_2$ are clamped between tools 30 and 31, and the second upright portions $10h_2$ are bent so as to extend radially outward. Next, vicinities of tip ends of the second upright portions $10h_2$ that are bent so as to extend radially outward are clamped between the tools 30 and 31, and the vicinities of the tip ends of the second upright portions $10h_2$ are bent so as to extend axially outward. Some of the second upright portions $10h_2$ thereby become crossover portions 12 that extend in radial directions axially outside the second coil ends 6*b*.

Next, bending is applied to the first conductor terminals 10*i*. As shown in FIG. 10, in the first conductor terminals 10*i*, intermediate portions of inclined first conductor terminals 10*i* are clamped between the tools 30 and 31, and the tools 30 and 31 are pivoted around the tool 30, bending the portions of the first conductor terminals 10*i* that are gripped by the tools 30 and 31. The vicinities of the tip ends that extend outward from the portions of the first conductor terminals 10*i* that are gripped by the tools 30 and 31 stand up due to this twisting action of the tools 30 and 31. The first conductor terminals 10*i* are thereby shaped by bending into first inclined portions $10i_1$ that extend out toward the second coil ends 6*b* from the slots 15, and that are inclined in a reverse direction to the second inclined portions $10h_1$, and first upright portions $10i_2$ that extend axially outward from the first inclined portions $10i_1$.

Here, as shown in FIG. 10, height positions from the end surface of the stator core 3 of the portions of the first conductor terminals 10*i* that are bent at the portions that are gripped by the tools 30 and 31 are varied on the twelve circumferentially consecutive first conductor terminals 10*i* that serve as connections in the alternating-current connecting portions, and the twelve first upright portions $10i_2$ are arranged at a nonuniform pitch. Thus, as shown in FIG. 11, gaps L between some of the adjacent first upright portions $10i_2$ are wider than gaps L between other adjacent first upright portions $10i_2$.

The height positions from the end surface of the stator core 3 of the portions of the first conductor terminals 10*i* that are bent at the portions that are gripped by the tools 30 and 31 are constant on the remaining thirty-six first conductor terminals 10*i* that do not serve as connections in alternating-current connecting portions, and are higher than the height positions from the end surface of the stator core 3 of the bent portions of the above-mentioned twelve first conductor terminals 10*i*. Thus, as indicated by the broken lines in FIG. 11, the first upright portions $10i_2$ of the thirty-six first conductor terminals 10*i* are arranged circumferentially at a pitch of one slot. Circumferential positions of the first upright portions $10i_2$ of the thirty-six first conductor terminals 10*i* align approximately with circumferential positions of the second upright portions $10h_2$ of the second conductor terminals 10*h* on which the crossover portions 12 are formed. In other words, the first upright portions $10i_2$ and the second upright portions $10h_2$ are disposed so as to face each other in close proximity in a radial direction, as shown in FIG. 9.

Specifically, in FIG. 6, the first upright portions $10i_2$ of the first conductor terminals 10*i* of the winding bodies 10 in which the first rectilinear portions 10*a* are housed in the second slot $5_2$ are disposed so as to face the second upright portions $10h_2$ of the second conductor terminals 10*h* of the winding bodies 10 in which the first rectilinear portions 10*a* are housed in the fourth slot $5_4$ in close proximity in a radial direction. The first upright portions $10i_2$ of the first conductor terminals 10*i* of first winding bodies 10 thereby face the second upright portions $10h_2$ of the second conductor terminals 10*h* of second winding bodies 10 that are two pole pitches away in close proximity in the radial direction. Thus, winding bodies 10 that are separated by two pole pitches can be connected by joining the first upright portions $10i_2$ and the second upright portions $10h_2$ that face each other in close proximity in a radial direction by TIG welding, etc.

Next, a connection method for the winding assembly 7 will be explained by allotting, for convenience, Slot Numbers 1, 2, etc., through 48 in circumferential order to the forty-eight slots 5 that are disposed circumferentially around the stator core 3.

Eight winding bodies 10 are first mounted into a first slot group that includes slots 5 at Slot Numbers (1+6n), where n is a natural number that is greater than or equal to zero and less than or equal to seven. Four winding bodies 10 that are arranged at a pitch of two magnetic poles among the eight winding bodies 10 are respectively connected in series to form small coil groups U11 and U12.

Next, eight winding bodies 10 are mounted into a second slot group that includes slots 5 at Slot Numbers (2+6n). Four winding bodies 10 that are arranged at a pitch of two magnetic poles among the eight winding bodies 10 are respectively connected in series to form small coil groups U21 and U22.

Eight winding bodies 10 are mounted into a third slot group that includes slots 5 at Slot Numbers (3+6n). Four winding bodies 10 that are arranged at a pitch of two magnetic poles among the eight winding bodies 10 are respectively connected in series to form small coil groups V11 and V12.

Next, eight winding bodies 10 are mounted into a fourth slot group that includes slots 5 at Slot Numbers (4+6n). Four winding bodies 10 that are arranged at a pitch of two magnetic poles among the eight winding bodies 10 are respectively connected in series to form small coil groups V21 and V22.

Eight winding bodies 10 are mounted into a fifth slot group that includes slots 5 at Slot Numbers (5+6n). Four winding bodies 10 that are arranged at a pitch of two magnetic poles among the eight winding bodies 10 are respectively connected in series to form small coil groups W11 and W12.

Next, eight winding bodies 10 are mounted into a sixth slot group that includes slots 5 at Slot Numbers (6+6n). Four winding bodies 10 that are arranged at a pitch of two magnetic poles among the eight winding bodies 10 are respectively connected in series to form small coil groups W21 and W22.

Twelve small coil groups U11, U12, U21, U22, V11, V12, V21, V22, W11, W12, W21, and W22 that are each configured by connecting in series four winding bodies 10 that are arranged at a pitch of two magnetic poles circumferentially around the stator core 3 are produced in this manner.

Moreover, from a viewpoint of suppressing the occurrence of damage to insulating coatings on the conductor wires 9 when the root portions of the second upright portions 10$h_2$ of the second conductor terminals 10$h$ are bent in order to form the crossover portions 12, it is desirable to make a bending radius of the second upright portions 10$h_2$ greater than a thickness of the second upright portions 10$h_2$ in the direction of bending, i.e., the wire thickness d.

As shown in FIG. 12, the second upright portions 10$h2$ of the second conductor terminals 10$h$, which constitute first ends of the twelve small coil groups U11, U12, U21, U22, V11, V12, V21, V22, W11, W12, W21, and W22, are arranged at a pitch of one slot circumferentially around a radially inner side of a circular arc-shaped region 13 that extends in a circular arc shape circumferentially around the second coil ends 6$b$, and the first upright portions 10$i_2$ of the first conductor terminals 10$i$, which constitute second ends, are arranged at a nonuniform pitch circumferentially around a radially outer side of the circular arc-shaped region 13 of the second coil ends 6$b$. The crossover portions 12 that are constituted by some of the second upright portions 10$h_2$ of the second conductor terminals 10$h$ that are led radially outward so as to pass axially outside the second coil ends 6$b$ are arranged at a pitch of one slot circumferentially around a C-shaped region that spans the circular arc-shaped region 13 on which the second and first upright portions 10$h_2$ and 10$i_2$ of the second and first conductor terminals 10$h$ and 10$i$ of the twelve small coil groups U11, U12, U21, U22, V11, V12, V21, V22, W11, W12, W21, and W22 are arranged circumferentially.

The twelve small coil groups U11, U12, U21, U22, V11, V12, V21, V22, W11, W12, W21, and W22 are connected by connecting the second and first upright portions 10$h_2$ and 10$i_2$ of the second and first conductor terminals 10$h$ and 10$i$ of the twelve small coil groups U11, U12, U21, U22, V11, V12, V21, V22, W11, W12, W21, and W22 using the connecting units 20 in the circular arc-shaped region 13. This circular arc-shaped region 13 constitutes a connecting region of the alternating-current connecting portions.

The connecting units 20 include: a neutral point connecting plate 21; electric power supplying coils 25 that are connected to electric power supplying terminals of phase windings that are disposed radially inside the second coil ends 6$b$, and that transfer connecting portions with electric power supplying wires from an external electric power supply radially outside the second coil ends 6; and connecting coils 26 that connect between similar or identical phase small coil groups. First and second neutral point connecting busbars 22 and 23 are produced by applying punching and bending to steel sheets, as shown in FIG. 13. As shown in FIG. 14, the neutral point connecting plate 21 is produced by insert-molding the first and second neutral point connecting busbars 22 and 23 using an insulating resin 24. As shown in FIG. 15, the electric power supplying coils 25 are produced by bending and shaping flat rectangular steel plates into a U shape in which a first end portion 25$a$ and a second end portion 25$b$ protrude in identical directions from two ends of a linking portion 25$c$. As shown in FIG. 16, the connecting coils 26 are produced by bending and shaping conducting wires into a U shape.

A connecting coil 26 links the second and first upright portions 10$h_2$ and 10$i_2$ of the second and first conductor terminals 10$h$ and 10$i$ that are end portions of the small coil groups U11 and U22, which are offset by 30 electrical degrees, to produce a U1-phase winding in which the small coil groups U11 and U22 are connected in series. A connecting coil 26 links the second and first upright portions 10$h_2$ and 10$i_2$ of the second and first conductor terminals 10$h$ and 10$i$ that are end portions of the small coil groups V11 and V22, which are offset by 30 electrical degrees, to produce a V1-phase winding in which the small coil groups V11 and V22 are connected in series. A connecting coil 26 links the second and first upright portions 10$h_2$ and 10$i_2$ of the second and first conductor terminals 10$h$ and 10$i$ that are end portions of the small coil groups W11 and W22, which are offset by 30 electrical degrees, to produce a W1-phase winding in which the small coil groups W11 and W22 are connected in series.

A connecting coil 26 links the second and first upright portions 10$h_2$ and 10$i_2$ of the second and first conductor terminals 10$h$ and 10$i$ that are end portions of the small coil groups U21 and U12, which are offset by 30 electrical degrees, to produce a U2-phase winding in which the small coil groups U21 and U12 are connected in series. A connecting coil 26 links the second and first upright portions 10$h_2$ and 10$i_2$ of the second and first conductor terminals 10$h$ and 10$i$ that are end portions of the small coil groups V21 and V12, which are offset by 30 electrical degrees, to produce a V2-phase winding in which the small coil groups V21 and V12 are connected in series. A connecting coil 26 links the second and first upright portions 10$h_2$ and 10$i_2$ of the second and first conductor terminals 10$h$ and 10$i$ that are end portions of the small coil groups W21 and W12, which are offset by 30 electrical degrees, to produce a W2-phase winding in which the small coil groups W21 and W12 are connected in series.

The neutral point connecting plate 21 is disposed above the second coil ends 6$b$, and the terminals 22$a$, 22$b$, and 22$c$ of the first neutral point connecting busbar 22 are joined to the second and first conductor terminals 10$h$ and 10$i$ of the small coil groups U12, V12, and W12. In addition, the terminals 23$a$, 23$b$, and 23$c$ of the second neutral point connecting busbar 23 are joined to the second and first conductor terminals 10$h$ and 10$i$ of the small coil groups U22, V22, and W22. As shown in FIG. 17, a first three-phase alternating-current winding 6A that is configured by wye-connecting the U1-phase winding, the V1-phase winding, and the W1-phase winding and a second three-phase alternating-current winding 6B that is configured by wye-connecting the U2-phase winding, the V2-phase winding, and the W2-phase winding are formed thereby. In addition, the first end portions 25$a$ of the electric power supplying coils 25 are connected to the second upright portions 10$h_2$ of the second conductor terminals 10$h$, which constitute the power supplying terminals of the first and second three-phase alternating-current windings 6A and 6B. The second end portions 25$b$ of the electric power supplying coils 25 are disposed in central positions of spaces between adjacent first upright portions 10$i_2$ of the first conductor terminals 10$i$ by the linking portions 25$c$ that extend in a radial direction axially outside the second coil ends 6$b$. Here, external electric power is supplied to the second end portions 25$b$ of the electric power supplying coils 25 and to the first upright portions 10$i_2$ of the first conductor terminals 10$i$ that constitute the electric power supplying terminals of the first and second three-phase alternating-current windings 6A and 6B by means of electric power supplying wires (not shown).

Now, as shown in FIG. 12, the central portions of the spaces between the adjacent first upright portions 10$i_2$, in which the spacing L is widened, are positioned radially outside the second upright portions 10$h_2$ of the second conductor terminals 10$h$ that constitute the electric power supplying terminals of the first and second three-phase alternating-current windings 6A and 6B. In other words, the second upright portions $10h_2$ of the second conductor terminals $10h$ that constitute the electric power supplying terminals of the first and second three-phase alternating-current windings 6A and 6B are disposed in the central portions of the spaces between the adjacent first upright portions $10i_2$ in which the spacing L is widened when viewed from radially outside. Connecting portions between the electric power supplying wires of the second conductor terminals $10h$ that constitute the electric power supplying terminals of the first and second three-phase alternating-current windings 6A and 6B are led out by the electric power supplying coils 25 that extend radially outward from the second upright portions $10h_2$ to the central positions of the spaces between the adjacent first upright portions $10i_2$ in which the spacing L is widened.

The stator winding 6 is constituted by the first and second three-phase alternating-current windings 6A and 6B. Each of the phase windings of the first and second three-phase alternating-current windings 6A and 6B is configured by connecting eight winding bodies 10 in series. Thus, using the U-phase winding as an example, the U1-phase winding and the U2-phase winding of the first and second three-phase alternating-current windings 6A and 6B are in a parallel relationship relative to the external electric power. Consequently, the number of parallel phase windings in this stator winding 6 is two.

As shown in FIG. 12, twelve second upright portions $10h_2$ are arranged at a pitch of one slot in the circular arc-shaped region 13 for the alternating-current connecting portions. Consequently, the angular range of the circular arc-shaped region 13 is 360 electrical degrees. Because the number of parallel phase windings in the stator winding 6 is two, the angular range of the circular arc-shaped region 13 is (180×2) electrical degrees. Moreover, in Patent Literature 1, the angular range of the region that corresponds to the circular arc-shaped region 13 is also 360 electrical degrees. However, in Patent Literature 1, because the respective phase windings are single windings that are configured by connecting coil segments in series, and the number of parallel phase windings is one, the angular range of the region that corresponds to the circular arc-shaped region 13 is (360×1) electrical degrees. Consequently, according to Embodiment 1, even though the number of parallel phase windings is two, the angular range of the circular arc-shaped region 13 can be set to an angular range that is equal to that of Patent Literature 1, in which the number of parallel phase windings is one.

According to Embodiment 1, the number of parallel phase windings in the stator winding 6 is two, and an angular range of (180×n) electrical degrees is achieved in a circular arc-shaped region 13 by distributing the positions at which the respective sets of three (U-phase, V-phase, and W-phase) electric power supplying terminals are led out from inside slots 5 between a radially innermost position and a radially outermost position inside the slots 5. Moreover, n is the number of parallel phase windings, and in this case is two. Because the angular range for the alternating-current connecting portions can be made less than or equal to (180×n) electrical degrees in this manner, reductions in size and weight of the connecting units 20 can be achieved. Because reductions in the size and weight of the stator 1 can be achieved thereby, mountability to a vehicle of the rotary electric machine to which the stator 1 is mounted can be improved, and vibration resistance can be improved.

Central portions of spaces between adjacent first upright portions $10i_2$ are positioned radially outside second upright portions $10h_2$ of second conductor terminals $10h$ that constitute electric power supplying terminals of first and second three-phase alternating-current windings 6A and 6B. Thus, electric power can be supplied to the electric power supplying terminals that are positioned on a radially inner side through spaces between adjacent first upright portions $10i_2$ that are positioned on a radially outer side of the electric power supplying terminals. Electrical insulation distances can thereby be ensured by a simple construction without adopting a complex three-dimensional crossing construction of a kind that supplies electric power to the electric power supplying terminals that are positioned on the radially inner side around axially outer sides of the first conductor terminals $10i$ that are positioned on the radially outer side, enabling high insulation performance to be obtained.

Because spacing L between adjacent first upright portions $10i_2$ that are positioned on a radially outer side of electric power supplying terminals that are positioned on a radially inner side is wider than spacing between other adjacent first upright portions $10i_2$, large electrical insulation distances can be ensured, enabling higher insulation performance to be achieved.

Electric power supplying coils 25 are included that are constituted by: first end portions 25a that are joined to the second upright portions $10h_2$ of the second conductor terminals $10h$ that constitute the electric power supplying terminals; second end portions 25b that are positioned in the central portions of the spaces between the adjacent first upright portions $10i_2$; and linking portions 25c that extend in a radial direction axially outside second coil ends 6b to link the first end portions 25a and the second end portions 25b. Thus, all of the electric power supplying terminals are positioned at radial positions of the first upright portions $10i2$, facilitating the connecting work between the electric power supplying wires and the electric power supplying terminals.

The second and first upright portions $10h_2$ and $10i_2$ of the second and first conductor terminals $10h$ and $10i$ of winding bodies 10 that constitute twelve small coil groups U11, U12, U21, U22, V11, V12, V21, V22, W11, W12, W21, and W22 are arranged circumferentially in a C-shaped region that spans the circular arc-shaped region 13. The circumferential positions of the second upright portions $10h_2$ are aligned with the circumferential positions of the first upright portions $10i_2$ that subject to joining thereto. Thus, the joining of the second and first upright portions $10h_2$ and $10i_2$ that are subject to connection is facilitated. Because crossover portions 12 that extend radially outward are formed integrally on the second conductor terminals $10h$ by bending root portions of the second upright portions $10h_2$, it is not necessary to connect the second and first upright portions $10h_2$ and $10i_2$ using separate members, enabling simplification of construction to be achieved.

Because the stator winding 6 is constituted by winding bodies 10 that are mounted to the stator core 3 at a pitch of one slot so as to be equal in number to the slots 5, only one type of winding body 10 is used, enabling manufacturing costs to be reduced.

The winding bodies 10 include: a distributed winding pattern in which two δ-shaped coil patterns are arranged in a radial direction; and first and second conductor terminals $10i$ and $10h$ that extend outward in identical directions from two end portions of the distributed winding pattern in question. The second conductor terminals $10h$ are constituted by second inclined portions $10h_1$ and second upright portions $10h_2$, and the first conductor terminals $10i$ are formed so as to be inclined in an opposite direction to the second inclined portions $10h_1$. Thus, the only step of bending the first conductor terminals 10*i* after the winding bodies 10 are mounted to the stator core 3 is a step of bending to stand the first upright portions 10$i_2$ up, enabling improvements in productivity to be achieved.

In the step of bending the first conductor terminals 10*i* inside the circular arc-shaped region 13, the height positions from the end surface of the stator core 3 of the portions of the first conductor terminals 10*i* that are clamped by the tools 30 and 31 are varied to enlarge the spacing between the first upright portions 10$i_2$ of the adjacent first conductor terminals 10*i* as desired. Positions at which spacing is enlarged may thereby be set freely among the spacing between the first upright portions 10$i_2$ of adjacent first conductor terminals 10*i*, enabling the degree of design freedom to be increased. It also no longer necessary to prepare dedicated winding bodies 10 in order to enlarge the spacing, enabling a single type of winding body 10 to be used.

Because the small coil groups U11, U12, U21, U22, V11, V12, V21, V22, W11, W12, W21, and W22 are alternating-current-connected within the circular arc-shaped region 13, in which crossover portions 12 are not present, axial height of the alternating-current connecting wire portions from the second coil ends 6*b* due to the connecting units 20 is reduced, enabling the axial length of the stator 1 to be shortened.

The alternating-current connecting wire portions are close to the end surface of the stator core 3, improving the vibration resistance of the neutral point connecting plate 21, the electric power supplying coils 25, and the connecting coils 26.

Because the electric power supplying coils 25, the connecting coils 26, and the neutral point connecting plate 21 are disposed within a radial region between the second and first conductor terminals 10*h* and 10*i* of the small coil groups U11, U12, U21, U22, V11, V12, V21, V22, W11, W12, W21, and W22 and are connected to the second and first conductor terminals 10*h* and 10*i* that are subject to connection, parts other than the electric power supplying coils 25 will not protrude radially outward from the coil ends. Interference with peripheral parts of the rotary electric machine is thereby less likely, improving mountability.

Because the phase windings are configured by connecting together small coil groups that are offset by 30 electrical degrees using the connecting coils 26, the second and first conductor terminals 10*h* and 10*i* that are connected by the connecting coils 26 are circumferentially adjacent. Thus, connecting work is facilitated, and overlapping of connecting coils 26 within the circular arc-shaped region 13 and overlapping between the electric power supplying coils 25 and the connecting coils 26 are also kept to a minimum, enabling the axial height of the alternating-current connecting wire portions from the second coil ends 6*b* due to the connecting units 20 to be reduced.

Moreover, in Embodiment 1 above, the winding bodies are produced using conductor wire that has a rectangular cross section, but the cross section of the conductor wire that constitutes the winding bodies is not limited to a rectangular shape, and conductor wire that has a circular cross section may be used, for example.

In Embodiment 1 above, a first three-phase alternating-current winding is configured by wye-connecting the U1-phase winding, the V1-phase winding, and the W1-phase winding, and a second three-phase alternating-current winding is configured by wye-connecting the U2-phase winding, the V2-phase winding, and the W2-phase winding, but a first three-phase alternating-current winding may be configured by delta-connecting the U1-phase winding, the V1-phase winding, and the W1-phase winding, and a second three-phase alternating-current winding configured by delta-connecting the U2-phase winding, the V2-phase winding, and the W2-phase winding.

In Embodiment 1 above, a U1-phase winding, a V1-phase winding, a W1-phase winding, a U2-phase winding, a V2-phase winding, and a W2-phase winding are each configured by connecting small coil groups in series, but a U1-phase winding, a V1-phase winding, a W1-phase winding, a U2-phase winding, a V2-phase winding, and a W2-phase winding may each be configured by connecting small coil groups in parallel. In that case, the number of parallel phase windings in the stator winding 6 is four.

In Embodiment 1 above, a stator core on which forty-eight slots are disposed is used, but the total number of slots is not limited to forty-eight. Furthermore, the slots are formed at a ratio of two slots per phase per pole, but the number of slots per phase per pole is not limited to two, and may be one, or may be three or greater. In Embodiment 1, the number of slots per phase per pole was two, and the spacing between the slots into which the rectilinear portions of the winding bodies are inserted was an angular pitch of six slots (a pitch of one magnetic pole), but if the number of slots per phase per pole is one, spacing between the slots into which the rectilinear portions of the winding bodies are inserted is an angular pitch of three slots (a pitch of one magnetic pole).

In Embodiment 1 above, winding bodies have been used in which two δ-shaped coil patterns that are arranged radially are formed continuously, but winding bodies may be formed using one δ-shaped coil pattern, or may be formed using three or more δ-shaped coil patterns that are arranged radially.

In Embodiment 1 above, winding bodies have been used in which two δ-shaped coil patterns that are arranged radially are formed continuously, but the winding bodies are not limited to winding bodies in which two δ-shaped coil patterns that are arranged radially are formed continuously, provided that distributed winding bodies are disposed at a pitch of one slot so as to be equal in number to the number of slots in the stator core, and the first conductor terminals of each of the winding bodies protrude axially outward from radially outside second coil ends, and the second conductor terminals protrude axially outward from radially inside the second coil ends. For example, winding bodies may be used that are formed into a "hexagonal" coil pattern in which a conductor wire is wound helically for a plurality of turns. The winding bodies in which the two δ-shaped coil patterns are formed continuously are mounted into three slots that are separated by a pitch of one magnetic pole, but the winding bodies that are formed into the hexagonal coil pattern are mounted into two slots that are separated by a pitch of one magnetic pole.

In Embodiment 1 above, crossover portions are formed by bending root portions of second upright portions of second conductor terminals, but crossover portions may be produced using separate members from the second conductor terminals, and first upright portions of first conductor terminals and second upright portions of second conductor terminals linked by joining both to the separate members.

In Embodiment 1 above, the number of parallel phase windings is two, and respective sets of three electric power supplying terminals are configured using first conductor terminals and second conductor terminals, but one set of three electric power supplying terminals may be constituted by first conductor terminals and another set of three electric power supplying terminals constituted by second conductor terminals. In that case, the angular range of the circular arc-shaped region for the alternating-current connecting portions is also (180×2) degrees.

What is claimed is:

1. A rotary electric machine stator comprising:
   an annular stator core in which slots are arranged circumferentially; and
   a three-phase alternating-current winding that is mounted to said stator core,
   wherein:
   said three-phase alternating-current winding comprises distributed winding bodies that are each constituted by a jointless continuous conductor wire that is coated with insulation, said distributed winding bodies being mounted to said stator core circumferentially at a pitch of one slot so as to be equal in number to a total number of said slots;
   a first conductor terminal of said conductor wire that constitutes said winding bodies extends outward at a first axial end of said stator core from a radially outermost position inside said slots, and a second conductor terminal of said conductor wire extends outward at said first axial end of said stator core from a radially innermost position inside said slots;
   a plurality of small coil groups each constitute a series connected body of a plurality of said winding bodies in which said first conductor terminals of winding bodies and said second conductor terminals of winding bodies that are subject to connection therewith are connected;
   first conductor terminals that constitute respective first ends of said plurality of small coil groups among said first conductor terminals are disposed so as to be spaced apart from each other circumferentially around a radially outer side of a circular arc-shaped region that extends circumferentially around a coil end of said three-phase alternating-current winding that is formed at said first axial end of said stator core;
   second conductor terminals that constitute respective second ends of said plurality of small coil groups among said second conductor terminals are arranged so as to be spaced apart from each other circumferentially around a radially inner side of said circular arc-shaped region;
   said three-phase alternating-current winding is configured by connecting said first conductor terminals and said second conductor terminals that are disposed in said circular arc-shaped region using connecting units;
   electric power supplying terminals of said three-phase alternating-current winding are constituted by said first conductor terminals and said second conductor terminals that are disposed in said circular arc-shaped region;
   a number of parallel phase windings in said three-phase alternating-current winding is n, where n is a natural number that is greater than or equal to one;
   an angular range of said circular arc-shaped region is less than or equal to (180×n) electrical degrees; and
   said second conductor terminals that constitute said electric power supplying terminals are positioned between adjacent first conductor terminals when viewed from a radially outer side.

2. The rotary electric machine stator according to claim 1, wherein among spacing between said adjacent first conductor terminals in said circular arc-shaped region, spacing is widest between said adjacent first conductor terminals where said second conductor terminals that constitute said electric power supplying terminals are positioned when viewed from a radially outer side.

3. The rotary electric machine stator according to claim 2, further comprising an electric power supplying coil that comprises:
   a first end portion that is joined to said second conductor terminal that constitutes said electric power supplying terminal; and
   a second end portion that is positioned between said adjacent first conductor terminals; and
   a linking portion that extends in a radial direction axially outside said coil end to link said first end portion and said second end portion.

4. The rotary electric machine stator according to claim 1, wherein in a C-shaped region that spans said circular arc-shaped region:
   said first conductor terminals have a first upright portion that extends axially on a tip end portion;
   said second conductor terminals have a second upright portion that extends axially on a tip end portion; and
   circumferential positions of said second upright portions are aligned with circumferential positions of said first upright portions that are subject to connection therewith.

5. The rotary electric machine stator according to claim 4, wherein said second conductor terminals have a crossover portion that extends radially outward at a position that is axially outside said coil end, said second upright portion facing and being joined together radially with a first upright portion that is subject to connection therewith.

6. A manufacturing method for the rotary electric machine stator according to claim 1, wherein said manufacturing method comprises steps of:
   producing said winding bodies in which said conductor wire is wound into a distributed winding pattern, said second conductor terminal is formed into a shape that comprises: a second inclined portion that protrudes outward from said distributed winding pattern; and a second upright portion that protrudes outward from said second inclined portion, and said first conductor terminal is formed into a shape that protrudes from said distributed winding pattern so as to be inclined in a reverse direction to said second inclined portion;
   mounting said winding bodies to said stator core at a pitch of one slot in a circumferential direction so as to be equal in number to a total number of said slots such that said first conductor terminal extends outward at a first axial end of said stator core from said radially outermost position inside said slots, and said second conductor terminal extends outward at said first axial end of said stator core from said radially innermost position inside said slots; and
   bending said first conductor terminals by clamping an intermediate portion of said first conductor terminal that extends outward at said first axial end of said stator core from said radially outermost position inside said slots using a tool to stand up said first conductor terminal on a tip end side of said intermediate portion using a twisting action of said tool to form:
   a first inclined portion that extends outward in a reverse direction to said second inclined portion from said radially outermost position inside said slots; and
   a first upright portion that extends in an axial direction from said first inclined portion.

7. The manufacturing method for a rotary electric machine stator according to claim 6, wherein in said step of bending said first conductor terminals, a position of clamping of said tool on said first conductor terminals is changed to widen spacing between first conductor terminals that are positioned radially outside said second upright portions of said second conductor terminals that constitute said electric power supplying terminals.

* * * * *